3,351,421
METHOD FOR TREATMENT OF CORROSION
Wilburn A. Boggs, Smyrna, and Abraham A. Esral and Samuel C. Jacobsen, Atlanta, Ga., assignors to Lockheed Aircraft Corporation, Burbank, Calif.
Filed May 14, 1965, Ser. No. 455,759
4 Claims. (Cl. 21—2.7)

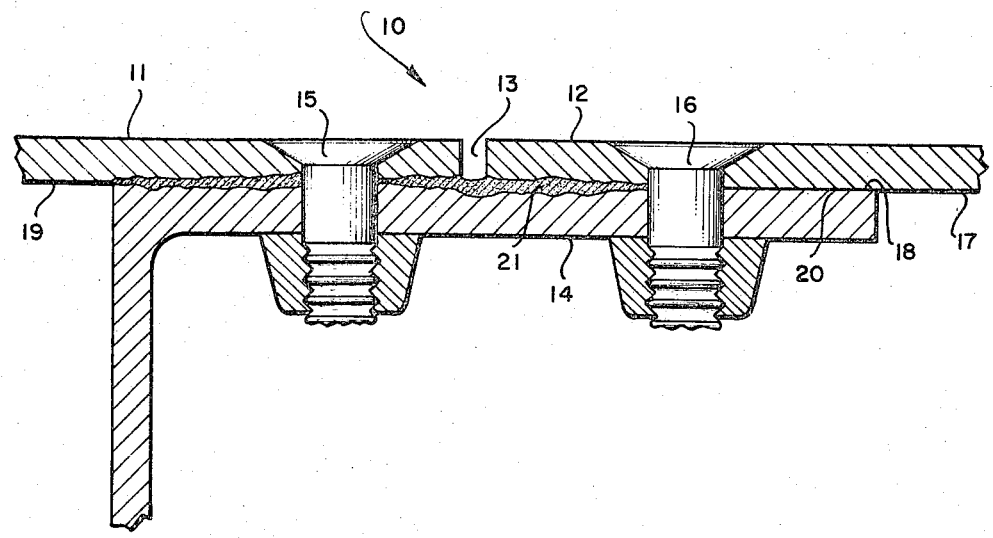

This invention relates in general to a method for treatment of corrosion and in particular to a method for treatment of corrosion occurring in mating metallic members.

The problem of corrosion and the undesirable results flowing from corrosion are well known to those skilled in the art. An extensive amount of time, money, and manhours is spent annually in preventing corrosion and in repairing the results, such as weakening of structural members, of corrosion.

The problems caused by corrosion, while undesirable wherever they may be found, are particularly bothersome in circumstances where the corrosion occurs in areas not readily accessible for treatment. An example of this is found in the lap joints and other faying surfaces of air frame components, such as wings and the like, wherein adjacent portions of a structure such as the wing skin are positioned to form a substantially abuting joint and then are connected by riveting or other suitable fastening techniques to a structural support member with the overlapping interfaces between the adjoining structural portions and the structural support member being shown as faying surfaces.

Inasmuch as aircraft frequently are based and flown in locations adjoining salt water, salt mist or spray collects on the exposed surfaces of the air frame and is conducted by capillary action or by flowing through the abuting surfaces of adjacent structural portions and into the faying surfaces. Even if an aircraft is not operated in the vicinity of salt water, the presence of ordinary atmospheric moisture causes corrosion producing substances to be inducted into the faying surfaces. In a similar manner induction of corrosion producing substances into naturally occurring locations such as cracks, crevices, or the like can occur. The corrosion resulting in the faying surfaces is, of course, inaccessible unless it is desired to completely detach the structural portion from its support membmer so that the corrosion products can be removed and the metallic surfaces refinished. As a practical matter, this implies in the case of an aircraft virtually complete disassembly of the skin thereof to treat the affected areas, followed by reassembly. Such a process is, of course, prohibitively expensive and also results in an airplane being grounded for an extensive period of time. In the case of a military aircraft, this time simply may not be available, while with an aircraft used for civilian purposes the combined cost of the down time and the disassembly-corrosion removal-reassembly of the affected areas may be a substantial portion of the total cost of aircraft operation.

One apparent solution to this problem would be to seal the abutting surfaces with an appropriate sealant which would prevent moisture or other corrosion producing substances from entering the faying surfaces. This solution is effective to the extent that the sealant remains intact; however, cracks or other perforations in the sealant permit the entry of corrosion inducing substances, and the resulting corrosion and corrosion by-products in the faying surfaces actually can cause the sealant to be forced away from the joint whereby more extensive corrosion is permitted. Futhermore, in aircraft not originally equipped at time of manufacture with such sealant, a subsequent application of sealant may serve to entrap the existing corrosion products and corrosion producing substances and thus is, at best, only a partial solution to the problem.

According to the present invention, these problems have been greatly alleviated through the use of a method for inhibiting corrosion in faying surfaces which does not require disassembly of or other interference with the structural members undergoing treatment. According to this method, a suitable corrosion inhibiting solution is dispersed in at least a substantial portion of the faying surface by means of flowing, capillary action, or other fluid movement mechanisms.

Accordingly, an object of this invention is to provide an improved method of inhibiting corrosion.

Another object of this invention is to provide an improved method of inhibiting corrosion in abutting surfaces.

A further object of this invention is to provide an improved method of inhibiting corrosion in abutting surfaces which does not require the disassembly of such surfaces.

Still another object of this invention is to provide an improved method of inhibiting corrosion in aircraft faying surfaces.

The exact nature of this invention as well as other objects and advantages thereof will be readily apparent from consideration of the following specification relating to the annexed drawing in which:

The figure shows an example of a faying surface to be treated according to the present invention.

Stated generally, this invention comprises a method of treating faying surfaces or similar surface areas defining limited intersurface spacing to inhibit the formation of corrosion therein. The joint or other area undergoing treatment first is cleaned and then there is applied to this joint a corrosion inhibiting solution having appropriate viscosity and surface tension so that the flowability and wettability of the solution causes it to be inducted into the faying surfaces of the joint. Following this the joint or opening of the area undergoing treatment can, if desired, be sealed to prevent entry therein of corrosion inducing products and to prevent withdrawal of the inhibitor solution.

More specifically and with reference to the figure, there is shown generally at 10 an exemplary structural arrangement including structural portions 11 and 12 disposed in substantially coplanar fashion to include a joint 13 at abutting surfaces thereof. Structural portions 11 and 12 are secured to a support member 14 by suitable devices such as rivets 15 and 16 or the like. The faying surfaces, as the term is used in this specification, are those abutting surfaces defined by that part of surface 17 of structural portion 12 which faces surface 18 of support member 14, and that part of surface 19 of structural portion 11 which similarly faces surface 18. By way of explanation only and without intent to limit the application of this method, structural portions 11 and 12 could be adjoining portions of the skin of an aircraft wing surface and support member 14 cauld be a portion of the internal structure of the wing.

Although structural portions 11 and 12 will be fitted with respect to one another and with respect to support member 14 as closely as practicably permissible, there nonetheless will be some small but finite volume 20 contained between the faying surfaces because of the intersurface spacing therebetween. When moisture or other corrosion inducing products enters this volume 20 through joint 13 or otherwise, corrosion of one or more of surfaces 17 and 18 or 19 and 18 ensues as shown at 21. Inasmuch as this corrosion is the result of the conversion of a portion of the metal, such as aluminum, of which the structural portions and the support member are fabricated into corrosion products, such as aluminum oxide, the thickness of the structural portions and the support member will be diminished and the structure will be weakened if the corrosion is not checked.

In the practice of an embodiment of the method of this invention, joint 13 first is cleaned by removing any sealant or sealant residue if such exists at the joint. The entire joint to be treated preferably then is subjected to being cleaned or flushed as by the application of high pressure clean water externally of the joint. This has the effect not only of tending to clean joint 13 of itself but also tends to remove at least some of the corrosion products 21 and the corrosion producing products entrapped within the faying surfaces.

After the cleaning has been completed, all excess water must be removed from the joint and the joint then must be substantially completely dried by any suitable technique. In the case of an aircraft wing, for example, warm air may be circulated within the wing and, if necessary or desired, additional heat may be applied toward the joint externally of the wing. This drying must remove substantially all of the liquid from the joint and the faying surfaces to permit subsequent penetration of inhibitor solution therein.

After the drying has been accomplished, a suitable corrosion inhibiting solution is then applied to joint 13 and permitted to be dispersed throughout the faying surfaces. Any technique which will suitably accomplish this application is permissible; for example, a conventional plastic squeeze bottle with a long tapered spout may conveniently be used for applying the corrosion inhibiting solution to relatively level surfaces such as those shown in the figure. Examples of suitable corrosion inhibiting solutions are set forth below. The wettability of the solution used must be such as to ensure substantial penetration of the joint within a reasonable period of time.

After the corrosion inhibiting solution has been applied to the joint for a sufficient length of time to permit substantially complete penetration of the solution into the faying surfaces, the joint and the faying surfaces again are dried as set forth above leaving in the joint and the faying surfaces only the salt or other corrosion inhibiting element of the solution. After this has been accomplished, joint 13 then should be sealed with a suitable sealant to retain the inhibitor solution and to prevent future entry into this joint of corrosion producing substances.

Although the faying surface shown in the figure can rely on the effect of gravity to aid dispersion of the solution throughout the surface, it should be emphasized that this method is equally applicable to instances where the solution is introduced to a relatively low location with respect to a surface undergoing treatment and is caused to cover that surface by means of capillary action.

In the practice of this method, any corrosion inhibiting solution may be used which has satisfactory properties of surface tension and viscosity. The desirable values of these properties are determined in part by the spacing of the faying surfaces and ambient temperature. Two examples of corrosion inhibiting solutions which have been found to be appropriate in the practice of this method are given below; a more detailed description of these exemplary corrosion inhibiting solutions may be found by reference to copending applications Ser. No. 455,959, entitled "Corrosion Inhibitor Solution," filed May 14, 1965, and Ser. No. 455,985, entitled "Corrosion Inhibitor Solution," filed May 14, 1965, both of which are assigned to the same assignee as the present invention.

*Example A*

This example comprises a water-base solution including a metallic chromate and a vapor phase inhibitor for effecting corrosion inhibiting in faying surfaces of a metal such as aluminum. A suitable surface active agent is added to the solution as needed to adjust the surface tension thereof to a level whereat substantially all of the faying surface is quickly covered by the solution. Although the particular metal chromate chosen depends upon the nature of the metal whose corrosion it is desired to inhibit, examples of such chromate are magnesium chromate [$MgCrO_4$], calcium chromate [$CaCrO_4$], strontium chromate [$SrCrO_4$], zinc chromate [$ZnCrO_4$], cadmium chromate [$CdCrO_4$], and barium chromate [$BaCrO_4$].

All of the foregoing metallic chromates are chosen from Group II of the Periodic Table inasmuch as it has been found that metallic chromates of this group tend to produce reaction products having less alkalinity than do the metallic chromates of periodic Group I. These alkaline reaction products are harmful to certain metals, such as, for example, aluminum. Such secondary by-products are usually the hydroxide of the metal; for example, magnesium hydroxide [$Mg(OH)_2$]. However, it is not intended to limit the practice of this method to metallic chromates selected from Group II and such Group I metallic chromates as sodium chromate [$Na_2CrO_4$] also may be used.

The second corrosion inhibiting composition added to the solution of this example is a suitable vapor phase inhibitor such as cyclohexylammonium salt or diphenylamine. The exact composition of the vapor phase inhibitor is unimportant so long as the vapor of this inhibitor effectively functions to protect the faying surfaces from corrosion. It is believed that such vapor phase inhibitors function by forming an adsorbed film on the faying surfaces and that this film prevents these surfaces from being contacted and affected by corrosion inducing products. Inasmuch as a faying surface or similar area undergoing treatment may contain local irregularities causing portions of the opposed surfaces making up the faying surface to be separated to such an extent that the solution introduced cannot effectively treat these areas with metallic chromate, the presence of the vapor phase inhibitor nonetheless is effective to provide protection to the metal in such areas.

A suitable surface active agent is added to the solution, if required, to adjust the surface tension thereof to a level whereat substantially complete penetration of the faying surface is effectively and reasonably quickly accomplished. Any surface active agent may be used which does not react with the other components of this solution and which is effective in adjusting the surface tension of the solution to the desired level. By way of example only, a fluorocarbon surface active agent manufactured by the 3M Company and identified as FC–128 is suitable for this purpose.

An exemplary corrosion inhibiting solution prepared according to Example A is as follows:

| | |
|---|---|
| Water ml__ | 100 |
| Magnesium chromate grams__ | 30 |
| Cyclohexylammonium salt do____ | 1 |
| 3M surfactant FC–128 do____ | 0.14 |

To aid in the complete dissolution of the components, the cyclohexylammonium salt preferably first is predissolved in 10 ml. of water and the surface active agent is predissolved in 10 ml. of isopropyl alcohol. These predissolved solutions then are added to the solution of magnesium chromate and water, and this combined solution is agitated to accomplish substantially complete mixing of the components.

*Example B*

This solution is similar to the solution of Example A in that both solutions contain hexavalent chromium ions in the form of metallic chromates, a vapor phase inhibitor, and a surface active agent as required. The solution of Example B differs from that of Example A, however, in the additional inclusion of acid chromate ions obtained from chromic acid or acid dichromates. These acid chromate ions thus are obtained through the inclusion of such materials as $(M)CrO_4 \cdot (X)H_2O$ plus chromic acid or $(M)Cr_2O_7 \cdot (X)H_2O$, where (M) is a metal (monovalent or divalent) and (X) represents the appropriate quantity of water.

The chromic acid ions are added in the solution of Example B to convert into noncorrosive compositions the alkaline products resulting from the dissociation of the metallic chromate and also resulting from the corrosion products, which alkaline products tend to attack and cause additional corrosion of the metal undergoing treatment. For example, dissociation of magnesium chromate produces magnesium hydroxide, but this reacts with acid chromate ions as follows:

$$Mg(OH)_2 + CrO_3 + H_2O \rightarrow MgCrO_4 + 2H_2O$$

Thus, the magnesium hydroxide has been converted to magnesium chromate to provide an additional source of corrosion inhibiting chromate ions. Similarly, the corrosion products such as aluminum oxide [$Al_2O_3$] have combined with water to form aluminum hydroxide, but aluminum hydroxide reacts with the excess acid chromate ions according to the following reaction:

$$2Al(OH)_3 + 3CrO_3 + H_2O \rightarrow Al_2(CrO_4)_3 + 4H_2O$$

As the foregoing shows, the aluminum hydroxide has been converted into aluminum chromate which serves as an additional corrosion inhibiting substance.

An example of a solution made according to Example B is obtained by mixing the following solutions:

|  | Grams |
|---|---|
| $MgCrO_4 \cdot 7H_2O$ dissolved in 50 ml. water | 30 |
| $CrO_3$ dissolved in 25 ml. water | 11.3 |
| Cyclohexylcarbamic acid dissolved in 10 ml. water | 1 |
| FC–128 dissolved in 10 ml. isopropyl alcohol | 0.14 |

The first three solutions are mixed and water is added to make up to 100 ml. total solution. The solution of surface active agent is then slowly added while stirring.

Although the practice of this method has been herein described primarily as applying to faying surfaces or surfaces arising from the fabricated connection of two or more metal surfaces, it is to be understood that this is by way of explanation only and without intent to limit the use of this method. Additionally, by way of example, this method could be used to inhibit corrosion occurring in cracks or crevices actually occurring in metal. Furthermore, in the specific examples of solutions set forth herein the use of a certain quantity of an ingredient is by way of example only and without intent to limit. The use of this method in conjunction with a corrosion inhibitor solution having only a metallic chromate, for example, also is contemplated without intent to limit.

In most instances, the force of capillary action or the wettability of the solution is sufficient to cause adequate dispersion of the solution in the surfaces undergoing treatment. However, where severe corrosion or other conditions tend to inhibit or impede the smooth and rapid flow of corrosion inhibiting solution into the surfaces, additional techniques may be required to assist this flow. Such techniques may include, by way of example, the application of positive pressure at the point of application of the fluid or the application of negative pressure at a point or points situated at a remote portion of the faying surface undergoing treatment. In the previously given example of an aircraft wing, this negative pressure could be achieved by partially evacuating the air contained in the wing interior.

If the seal of a faying surface treated according to the method of this invention should break to permit water to be reintroduced to the surface, this water would recombine with any metallic chromate left within the surface at the time of drying to form a new solution of metallic chromate. This newly formed metallic chromate solution tends to inhibit corrosion and therefore tends to forestall the corrosive results of a break in the joint seal of the faying surface.

It should be understood, of course, that the foregoing relates to only a preferred embodiment of the invention and that numerous modifications or alterations may be made therein without departing from the spirit and the scope of the invention as set forth in the appended claims.

What is claimed is:

1. The method of effecting corrosion inhibiting treatment between faying joint surfaces in an assembled joint comprising the steps of:
    removing substantially all of any moisture which may be contained between the joint surfaces;
    applying at a region of access to the joint surfaces a joint surface wettable corrosion inhibiting solution having a surface tension and viscosity chosen to accomplish the substantially complete penetration of the joint surfaces; and
    dispersing the solution throughout a substantial portion of the joint surfaces at least in part by capillary action.

2. The method of claim 1 in which the step of removal of moisture between the joint surfaces is accomplished by heating the joint surfaces.

3. The method of claim 1 comprising the additional step of applying a joint sealant to the region of access to the joint surfaces to substantially prevent future presence of moisture in the joint between the joint surfaces.

4. The method of claim 3 comprising the additional step of removing substantially all moisture present in the joint between the joint surfaces after said dispersion of the solution has been accomplished and before application of the joint sealant.

References Cited
UNITED STATES PATENTS

| | | | |
|---|---|---|---|
| 2,207,808 | 7/1940 | Lamme | 134—42 X |
| 2,535,794 | 12/1950 | Hempel | 148—6.2 |
| 2,698,266 | 12/1954 | Thirsk | 148—6.2 |
| 3,007,214 | 11/1961 | Focht et al. | 21—2.7 X |
| 3,168,425 | 2/1965 | Wiplinger | 114—88 X |
| 3,252,215 | 5/1966 | De Long et al. | 29—460 X |

JOSEPH SCOVRONEK, *Acting Primary Examiner.*

MICHAEL E. ROGERS, *Examiner.*

F. W. BROWN, *Assistant Examiner.*